(12) United States Patent
Bourque et al.

(10) Patent No.: US 10,018,368 B2
(45) Date of Patent: Jul. 10, 2018

(54) SNOW PROOF ROOF VENT

(75) Inventors: Antoine Bourque, Belleville (CA);
Stephen Devan MooToo, Belleville (CA)

(73) Assignee: SnowVentCo Ltd., Scarborough (CA)

( * ) Notice: Subject to any disclaimer, the term of this patent is extended or adjusted under 35 U.S.C. 154(b) by 297 days.

(21) Appl. No.: 13/290,182

(22) Filed: Nov. 7, 2011

(65) Prior Publication Data

US 2013/0115871 A1    May 9, 2013

(51) Int. Cl.
F24F 7/02       (2006.01)
F24F 3/16       (2006.01)

(52) U.S. Cl.
CPC ........ *F24F 7/02* (2013.01); *F24F 2003/1614* (2013.01); *F24F 2221/52* (2013.01); *Y02A 50/21* (2018.01)

(58) Field of Classification Search
CPC .. F24F 7/02; F24F 2003/1614; F24F 2221/52; F24F 13/082; E04D 13/17; E04D 13/176; E04D 13/174; Y02A 50/21
USPC ............................ 454/365, 366, 367; 52/199
See application file for complete search history.

(56) References Cited

U.S. PATENT DOCUMENTS

| | | | |
|---|---|---|---|
| 2,019,213 A | 10/1935 | Dahlam | |
| 2,628,551 A * | 2/1953 | Leigh | 454/366 |
| 2,989,145 A | 6/1961 | Goodloe | |
| 3,183,822 A * | 5/1965 | Stone et al. | 454/38 |
| 3,238,862 A | 3/1966 | Smith et al. | |
| 3,302,554 A | 2/1967 | Rousey et al. | |
| 3,593,478 A | 7/1971 | Mason | |
| 4,461,066 A | 7/1984 | Peterson | |
| 4,572,059 A * | 2/1986 | Ramsay | 454/367 |
| 4,593,504 A | 6/1986 | Bonnici et al. | |
| 4,621,569 A * | 11/1986 | Fioratti | 454/364 |
| 4,817,506 A * | 4/1989 | Cashman | 454/365 |
| 5,005,328 A * | 4/1991 | Holtgreve | 52/199 |
| 5,022,314 A * | 6/1991 | Waggoner | 454/250 |
| 5,427,571 A * | 6/1995 | Sells | E04D 3/40  454/365 |
| 5,505,852 A | 4/1996 | van Rossen | |
| 5,564,976 A * | 10/1996 | Muller et al. | 454/365 |
| 5,603,657 A * | 2/1997 | Sells | E04D 13/174  454/359 |
| 5,704,834 A * | 1/1998 | Sells | 454/365 |
| 5,803,806 A * | 9/1998 | Blessinger | 454/365 |

(Continued)

*Primary Examiner* — Gregory Huson
*Assistant Examiner* — Dana Tighe
(74) *Attorney, Agent, or Firm* — Grant Tisdall

(57) ABSTRACT

There is disclosed a snow proof roof vent for ventilating the roof of a building to the atmosphere. The improved roof vent includes a flange portion dimensioned and configured to lay against the roof, the flange portion having a central opening to let air vent from the attic. The roof vent further includes a collar portion extending from the flange portion and enclosing the central opening and a cap dimensioned and configured to cover over the collar portion and cover over the central opening. The cap is dimensioned and configured to provide a passage through which air can pass between the atmosphere and the central opening. The collar portion also includes a filter plate enclosed by the cap and interposed between the central opening and the passage, the filter plate having a pore size sufficient to permit air to pass through but block the passage of snow.

9 Claims, 3 Drawing Sheets

(56) References Cited

U.S. PATENT DOCUMENTS

| | | | |
|---|---|---|---|
| 5,960,595 A * | 10/1999 | McCorsley et al. | 52/199 |
| 5,989,303 A | 11/1999 | Hodge | |
| 6,155,008 A * | 12/2000 | McKee | 52/198 |
| 6,302,787 B1 * | 10/2001 | Graft, Jr. | 454/366 |
| 6,308,473 B1 * | 10/2001 | Auck | 52/199 |
| 6,309,546 B1 * | 10/2001 | Herrmann et al. | 210/500.25 |
| 6,319,300 B1 | 11/2001 | Chen | |
| 6,450,882 B1 * | 9/2002 | Morris et al. | 454/365 |
| 6,558,251 B2 * | 5/2003 | Sells | 454/359 |
| 6,589,113 B2 * | 7/2003 | Sells | 454/365 |
| 6,623,354 B2 * | 9/2003 | Morris et al. | 454/365 |
| 6,767,281 B2 * | 7/2004 | McKee | 454/367 |
| 6,805,627 B2 | 10/2004 | Marts et al. | |
| 6,978,803 B2 * | 12/2005 | Brown et al. | 138/96 R |
| 7,063,733 B2 | 6/2006 | Mori et al. | |
| 7,182,688 B2 * | 2/2007 | Coulton | F24F 7/02 454/365 |
| 7,191,564 B2 * | 3/2007 | Higginbotham | 52/12 |
| D556,314 S | 11/2007 | Daniels, II et al. | |
| 7,384,331 B2 * | 6/2008 | Coulton | 454/365 |
| 7,485,034 B2 * | 2/2009 | Sells | 454/365 |
| 7,544,124 B2 * | 6/2009 | Polston | 454/367 |
| 7,708,625 B2 | 5/2010 | Leseman et al. | |
| 7,774,999 B2 * | 8/2010 | McKee | 52/199 |
| 7,780,510 B2 * | 8/2010 | Polston | 454/367 |
| 8,205,401 B2 * | 6/2012 | Ward | 52/198 |
| 8,209,923 B1 * | 7/2012 | Rich | 52/219 |
| 8,322,089 B2 * | 12/2012 | Railkar et al. | 52/198 |
| 2005/0239392 A1 * | 10/2005 | Sells | 454/165 |
| 2006/0116069 A1 * | 6/2006 | Urbanski et al. | 454/365 |
| 2007/0256399 A1 | 11/2007 | Yang | |
| 2008/0160903 A1 | 7/2008 | Fontana | |
| 2008/0220714 A1 * | 9/2008 | Caruso | E04D 13/152 454/365 |
| 2009/0013620 A1 | 1/2009 | West | |
| 2010/0107550 A1 * | 5/2010 | Toas et al. | 52/742.12 |
| 2010/0162643 A1 * | 7/2010 | Blomberg et al. | 52/200 |
| 2010/0255770 A1 * | 10/2010 | Blake et al. | 454/367 |
| 2011/0201266 A1 * | 8/2011 | Henderson | 454/365 |
| 2014/0342658 A1 | 11/2014 | Parkinson et al. | |

* cited by examiner

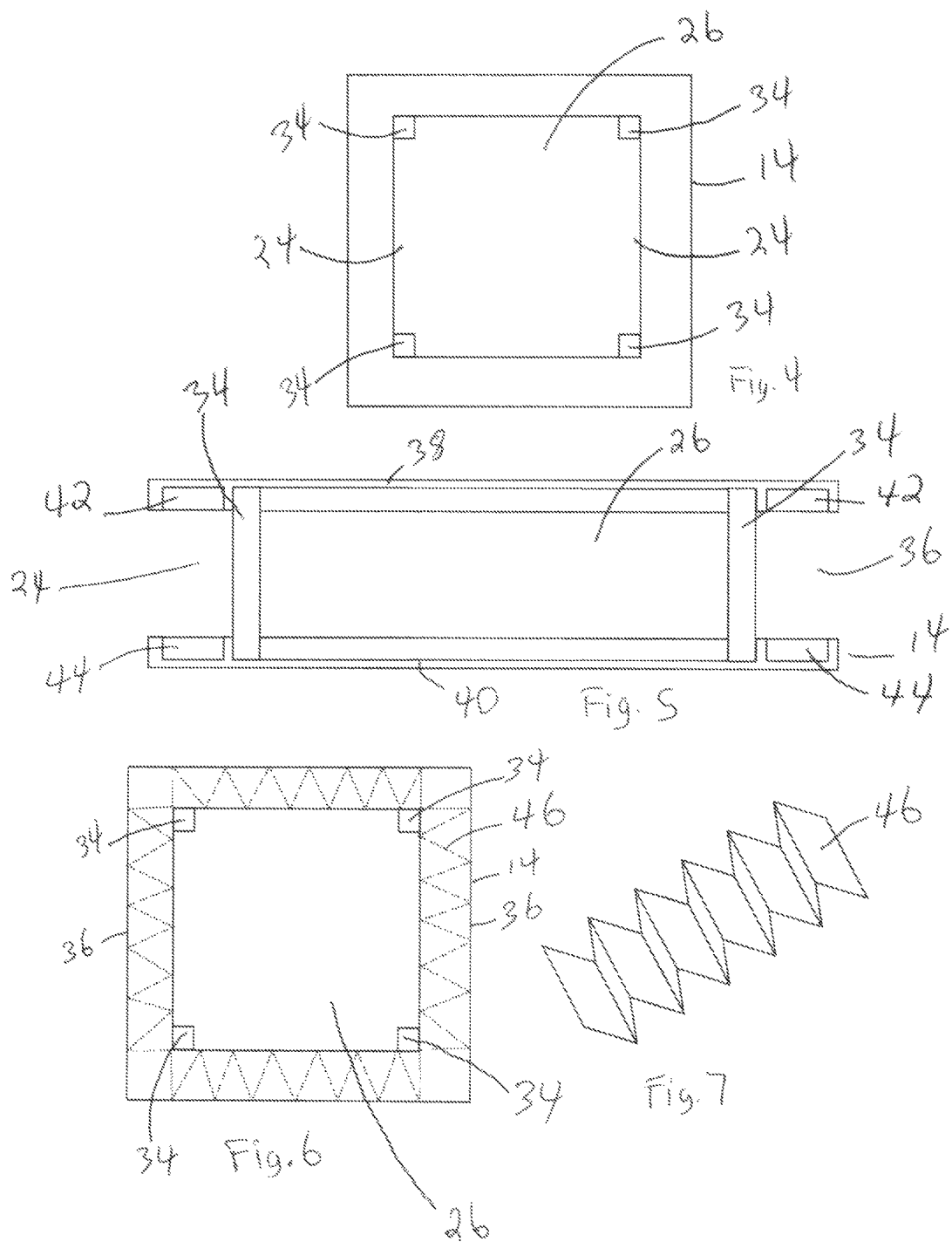

SNOW PROOF ROOF VENT

FIELD OF THE INVENTION

The invention relates generally to roof vents for venting the roof of a building such as a house.

BACKGROUND OF THE INVENTION

Roof vents provide the necessary ventilation to the roof of a house or other building, preventing condensation in the roof. Various roof vents employ vanes, grates and louvers to permit air to be channeled between the roof and the atmosphere, and to try to prevent rain from entering the roof through the roof vent. A variety of caps and covers have been used to act as a guard to prevent the infiltration of rain. However, prior art roof vents have thus far been ineffective in preventing the infiltration of snow into the attic space, particularly in cases of snow storms and the like. An improved roof vent which permits adequate attic ventilation but at the same time prevents the infiltration of snow is therefore required.

SUMMARY OF THE INVENTION

In accordance with one aspect of the present invention, there is provided a roof vent for ventilating the roof of a building to the atmosphere. The improved roof vent includes a flange portion dimensioned and configured to lay against the roof, the flange portion having a central opening to let air vent from the attic. The roof vent further includes a collar portion extending from the flange portion and enclosing the central opening and a cap dimensioned and configured to cover over the collar portion and cover over the central opening. The cap is dimensioned and configured to provide a passage through which air can pass between the atmosphere and the central opening. The collar portion also includes a filter plate dimensioned and configured to be enclosed by the cap and to be interposed between the central opening and the passage The filter plate has a pore size sufficient to permit air to pass through the filter plate but block the passage of snow.

A further aspect provided is a roof vent for ventilating a roof of a building via a hole in the roof to atmosphere, the roof vent comprising: a flange portion for resting on the roof, the flange portion having an opening for overlapping with the hole; a collar portion having sides extending upwardly from the flange portion about the opening, the collar portion having one or more apertures facilitating passage of air between the atmosphere and the opening; a cap covering over the collar portion and covering over the opening while having a gap between the flange portion and the cap providing for the passage of air between the flange portion and the cap; and a corrugated filter plate interposed between the flange portion and the cap providing for the passage of air between the atmosphere and the opening, the corrugated filter plate having a filter media formed in a series of alternating folds providing a surface area of furrows and ridges having a plurality of individual pores such that each of the plurality of folds comprises a fold line extending in a direction from the flange portion to the cap, the corrugated filter plate providing for the air passage through the surface area of the filter media via each of the plurality of individual pores to enter or exit the hole.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention.

DESCRIPTION OF THE DRAWINGS

FIG. 4 is a top view of the collar portion of the present invention.

FIG. 5 is a cross sectional view of the collar portion shown in FIG. 4.

FIG. 6 is a top view of the collar portion of the present invention with the filter plate mounted therein.

FIG. 7 is a perspective view of a portion of the filter plate portion of the present invention.

In the drawings like characters of reference indicate corresponding parts in the different figures.

DETAILED DESCRIPTION OF THE INVENTION

Figure 1:
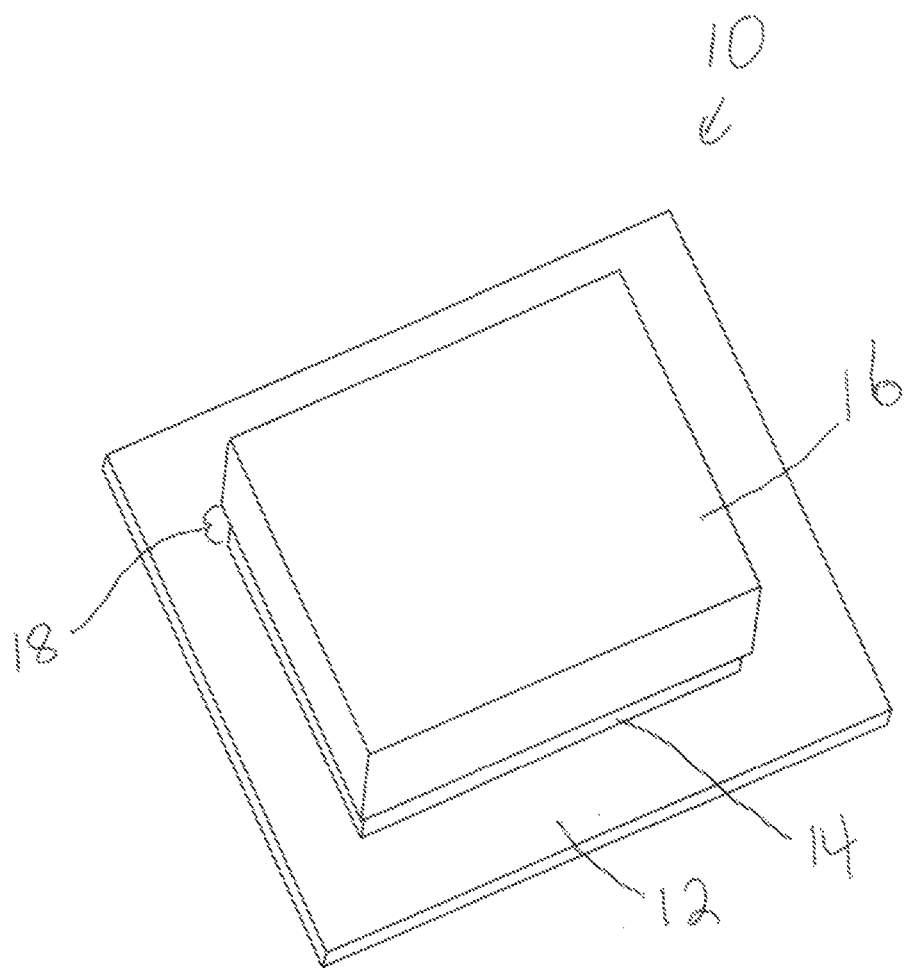
FIG. 1 is a perspective view of a roof vent made in accordance with the present invention.

Referring to FIG. 1, the present invention is an improved roof vent which provides for excellent roof ventilation while at the same time preventing the infiltration of snow into the attic. The roof vent, shown generally as item 10 consists of a flange portion 12, a collar portion 14 and a cap 16 configured to cover over most of the collar portion. Flange portion 12 is preferably flat to rest flush with the roof (not shown) to make it easy to install the roof vent. Collar 14 extends perpendicularly upward from flange 12. Cap 16 is dimensioned to enclose much of the collar but to leave a space gap 18 between the cap and flange portion 12 to permit atmospheric air to pass through collar portion 14.

Figure 2:
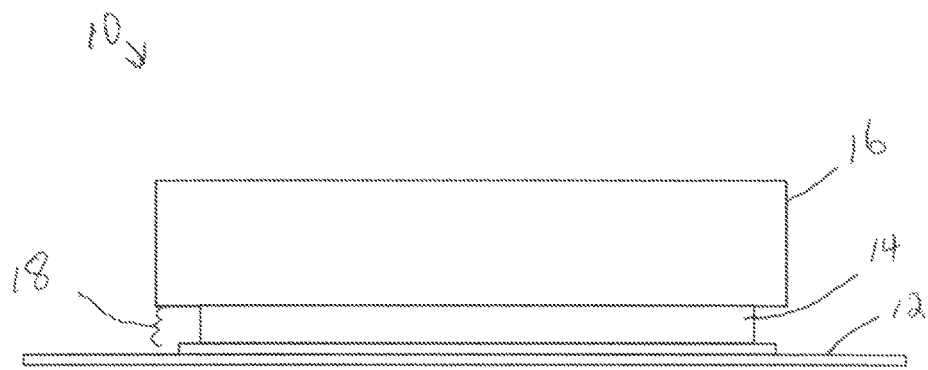
FIG. 2 is a side view of the roof vent shown in FIG. 1.
Figure 3:
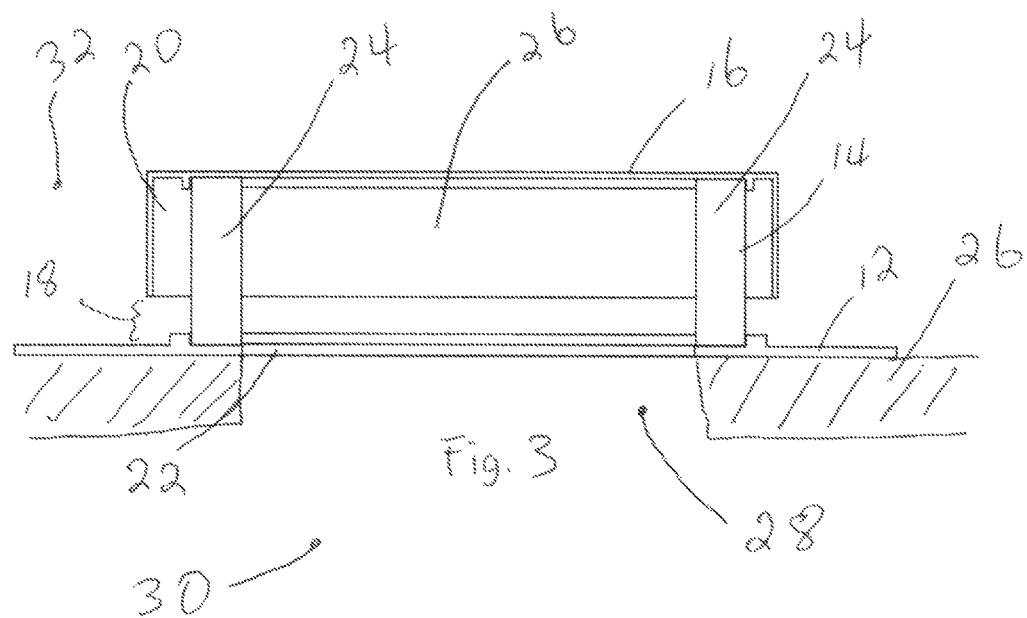
FIG. 3 is a cross sectional view of the roof vent shown in FIG. 2.

Referring now to FIGS. 2 and 3, flange portion 12 has a central aperture 22 and collar portion 14 has a central cavity 26 which communicates with aperture 22 permitting air to circulate between attic interior 30, through hole 28 in roof 26 and cavity 26. Collar 14 has apertures 24 through which air can circulate between cavity 26 and outside atmosphere 32 through air passage 20 and gap 18. As can be seen in FIGS. 4 and 5, collar 14 is formed as a annular frame having upper portion 38, lower portion 40 and sides 36 formed from support members 34. Apertures 24 are formed between support members 34. Cavity 26 forms a continuous opening between upper and lower portions 38 and 40, respectively. Upper and lower portions 38 and 40 have channels 42 and 44, respectively which are parallel to each other and which are dimensioned and configured to receive the side edges of corrugated filter plate 46 so that the corrugated filter plate is positioned transversely between interior 26 and aperture 24. Therefore, air passing from aperture 24 mass pass through filter plate 46 to enter cavity 26.

Filter plate 46 is preferably a wire mesh which is corrugated to increase its surface area. Filter plate 46 preferably has a pore size which is selected to prevent the passage of snow through the filter plate, while permitting the flow of air. It has been discovered that a pore size of approximately 120 microns is sufficient to prevent the passage of snow while allowing adequate air circulation through the filter plate.

Referring back to FIG. 3, collar 14 extends perpendicular to opening 22. Cap 16 is dimensioned to close off opening 22. An air passage 20 is formed between cap 16 and collar portion 14 so that air can flow through the side walls of collar 14 and air passage 20 and out gap 18. As mentioned above, collar portion 14 has a filter plate 46 (see FIG. 6) mounted thereto so that air flowing from outside vent 10 must pass through the filter plate before entering opening 22, hole 28 and attic interior 30. Any wind driven snow will be trapped between collar 14 and cap 16 and will not infiltrate attic space 30. Since air passage 20 is larger than gap 18, a quantity of snow can accumulate on the outside of collar 14 without blocking off the flow of air between exterior 32 and attic interior 30. As mentioned previously, the corrugation of filter plate 46 (see FIG. 7) permits a larger surface area, thereby increasing the amount of filter media available to permit air to flow through the filter plate.

It will be appreciated that numerous modifications can be made to invention without departing from the core of the invention. In particular, the corrugated filter plate may be laid out within the collar portion so that the filter plate lies parallel to opening 22. Certain advantages have been found to a perpendicular arrangement between the filter plate and opening 22. In particular, it has been discovered that a perpendicular arrangement allows for better air circulation through the roof vent while improving the roof vents ability to block wind driven snow. In some applications, it may be more cost effective to produce a roof vent where the filter plate is laid out parallel relative to the central opening.

A specific embodiment of the present invention has been disclosed; however, several variations of the disclosed embodiment could be envisioned as within the scope of this invention. It is to be understood that the present invention is not limited to the embodiments described above, but encompasses any and all embodiments within the scope of the following claims.

We claim:

1. A roof vent for ventilating a roof of a building via a hole in the roof to atmosphere, the roof vent exposed to atmospheric air, the roof vent comprising:

a flange portion for resting on the roof, the flange portion having an opening for overlapping with the hole;

a collar portion having a collar wall extending upwardly from the flange portion about the opening, the collar portion further having one or more apertures between the collar walls and an underside of a cap for facilitating passage of the atmospheric air between the opening and the hole;

the cap covering over the collar portion and covering over the opening while having a gap between the flange portion and the cap providing for the passage of the atmospheric air between the flange portion and the cap; and a corrugated filter plate interposed between the flange portion and the cap providing for the passage of the atmospheric air through the apertures, the corrugated filter plate having a filter media formed in a series of alternating folds providing a surface area of furrows and ridges having a plurality of individual pores such that each of the alternating folds comprises a fold line extending in a direction from the flange portion to the cap, the corrugated filter plate providing for the atmospheric air passage through the surface area of the filter media via each of the plurality of individual pores to enter or exit the hole.

2. The roof vent of claim 1 wherein a pore size of the filter media is approximately 120 microns.

3. The roof vent of claim 1 wherein the corrugated filter plate has side edges adjacent to the collar portion and is positioned with the side edges positioned in channels formed in an upper portion and a lower portion of the collar portion.

4. The roof vent of claim 1, wherein the sides with the one or more apertures extends perpendicularly from the flange portion, the cap being coupled to a top of the collar portion, a bottom of the collar portion being coupled to the flange portion, such that the corrugated filter plate is positioned to cover the one or more apertures of the sides.

5. The roof vent of claim 4 wherein the pore size of the filter media is approximately 120 microns.

6. The roof vent of claim 5 wherein the pore size blocks the passage of snow.

7. The roof vent of claim 1, wherein the corrugated filter plate is in a perpendicular arrangement with respect to the flange portion.

8. The roof vent of claim 1 further comprising channels for receiving side edges of the corrugated filter plate for facilitating placement of the corrugated filter plate between the flange portion and the cap.

9. The roof vent of claim 1, wherein the corrugated filter plate extends about a periphery of the opening such that a peripheral shape of a wall of the corrugated filter plate is quadrilateral.

* * * * *